3,565,856
p-PHENYLENEDIAMINE ANTIOZONANTS
Keith Martyn Davies, Hanbridge, England, and Alan Jeffrey Neale, Llangollen, Wales, assignors to Monsanto Chemicals Limited, London, England, a British company
No Drawing. Filed Oct. 30, 1967, Ser. No. 679,177
Claims priority, application Great Britain, Nov. 3, 1966, 49,343/66
Int. Cl. C08f 45/58
U.S. Cl. 260—45.9
6 Claims

ABSTRACT OF THE DISCLOSURE

Derivatives of p-phenylenediamine having the formula

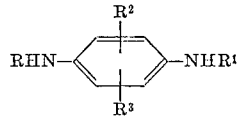

where R is secondary alkyl or cycloalkyl of up to eight carbon atoms, $R^1$ is secondary alkyl, cycloalkyl, or aryl of up to eight carbon atoms, and each of $R^2$ and $R^3$ is alkyl of up to five carbon atoms provided that the total number of carbon atoms in R, $R^1$, $R^2$, and $R^3$ is not greater than 20 are useful in rubber as antiozonants and resist discoloration and staining.

---

This invention relates to certain new compounds which are useful in rubber as antiozonants.

It is known that rubber is liable to deteriorate under conditions of normal use, due mainly to the action of heat, light, oxygen and ozone. The action of ozone on rubber, particularly rubber which is under tension, is manifested by the appearance of cracks in the surface of the rubber. The formation of such cracks necesarily has an adverse effect on the physical properties of the rubber, and to prevent or retard the process it has been proposed to add various substances, generally termed antiozonants, to the rubber. In some circumtsances it is not sufficient only that the additive should protect the rubber against the action of ozone. For instance, if an antiozonant is to be acceptable for use in light coloured rubber stocks or in rubber which is in contact with light coloured surfaces, it must not itself cause discoloration of the rubber or staining of a contiguous surface or give rise to oxidation products having these effects.

Various p-phenylenediamine derivatives, for example N-alkyl-N'-phenyl- and N,N'-dialkyl - p - phenylenediamines, are very effective antiozonants for rubber products where staining and discolouration are of little or no consequence, for example vehicle tyres containing carbon black as a reinforcing agent, but because of their tendency to stain and discolour, they are unsuitable for use in the circumctances referred to above.

To reduce the staining and discolouration associated with the usual p-phenylenediamine antiozonants, it has been proposed in U.S. Pat. No. 2,965,605 to employ N,N'-dialkyl-p-phenylenediamines in which the nucleus is fully alkylated. In such compounds, however, the improvement in staining and discolouration characteristics is achieved at the expense of lower antiozonant activity. We have now discovered that certain N,N'-disubstituted p-phenylenediamines containing only two nuclear alkyl substituents are no more, and in certain instances less discolouring than the tetra-nuclear alkylated p-phenylenediamines proposed in U.S. Pat. No. 2,965,605, while being more effective antiozonants. Other N,N'-disubstituted p-phenylenediamine derivatives containing two nuclear alkyl substituents have antiozonant activities about the same as the tetra-nuclear alkylated compounds but are less staining.

The p-phenylenediamine derivatives of the present invention are compounds having the formula

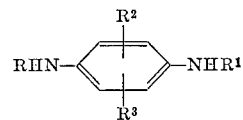

where R is a secondary alkyl or cycloalkyl group of up to 8 carbon atoms, $R^1$ is a secondary alkyl, cycloalkyl or aryl group of up to 8 carbon atoms, and each of $R^2$ and $R^3$ is an alkyl group of up to 5 carbon atoms, provided that the total number of carbon atoms in R, $R^1$, $R^2$ and $R^3$ is not greater than 20.

Examples of the secondary alkyl or cycloalkyl groups, from which R and $R^1$ can be selected are; isopropyl; s-butyl; 1,2-dimethylpropyl; 1,3-dimethylbutyl; 1,4-dimethylpentyl; 1-ethyl-3-methylpentyl; 1-methylheptyl; cyclopentyl; cyclohexyl; and 2-methylcyclohexyl. An aryl group $R^1$ is usually a phenyl or alkyl phenyl, for instance a tolyl group. The nuclear alkyl groups $R^2$ and $R^3$ can have either straight or branched chains, examples of such groups being methyl, ethyl, isopropyl, s-butyl, t-butyl and t-amyl.

High antiozonant activities are shown by the p-phenylenediamine derivatives of the invention in which each of R and $R^1$ is a secondary alkyl group of up to 8 carbon atoms and each of $R^2$ and $R^3$ is an alkyl group of up to 3 carbon atoms, and in which the total number of carbon atoms in R, $R^1$, $R^2$ and $R^3$ is not greater than 16, especially by compounds in which both $R^2$ and $R^3$ are methyl groups.

The antiozonant activity is not much affected by the positions of the nuclear alkyl groups, but the p-phenylenediamine derivatives where $R^2$ and $R^3$ occupy positions 2 and 5 in the nucleus generally show less discoloration than other isomers.

Specific examples of the new phenylenediamine derivatives are $N,N^1$ - diisopropyl-2,3-dimethyl-p-phenylenediamine; $N,N^1$-diisopropyl-2,5-dimethyl - p - phenylenediamine; $N,N^1$-diisopropyl-2,6-dimethyl - p - phenylenediamine; $N,N^1$-diisopropyl-2,5-diethyl-p-phenylenediamine; $N,N^1,2,5$ - tetraisopropyl-p-phenylenediamine; N,N-diisopropyl-2,5 - di-t-butyl-p-phenylenediamine; N,N - di-sec-butyl - 2,5 dimethyl-p-phenylenedimaine; $N,N^1$-bis(1,4-dimethylpentyl) - 2,5-dimethyl-p-phenylenediamine; $N,N^1$-bis(1,4 - dimethylpentyl)-2,5 - diisopropyl-p-phenylenediamine; $N,N^1$-dicyclohexyl-2,5-diethyl - p - phenylenediamine; N-isopropyl-$N^1$ - phenyl-2,5-dimethyl-p-phenylenediamine; and N(1,3 - dimethylbutyl) - $N^1$ - phenyl-2,5-di-t-butyl-p-phenylenediamine.

Where R and $R^1$ are aliphatic groups, the new p-phenylenediamines can be made by reductive alkylation of the appropriately substituted p-phenylenediamine

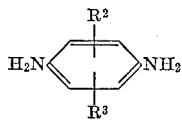

or a precursor (for example a nitro amine or dioxime) from which the phenylenediamine can be derived by reduction, using the aldehyde or ketone appropriate to the introduction of the groups R and $R^1$. For example acetone is used where R and $R^1$ are isopropyl groups, methyl isobutyl ketone where R and $R^1$ are 1,3-dimethyl groups, and cyclohexanone where R and $R^1$ are cyclohexyl groups.

Phenylenediamine derivatives where $R^1$ is an aryl group can be prepared by reductive alkylation of an appropriately substituted aminodiarylamine, that is to say a compound in which the groups $R^1$, $R^2$ and $R^3$ required in the product are already present.

The preferred reducing agent is molecular hydrogen in the presence of a hydrogenation catalyst, for example a noble metal. An excess of the aldehyde or ketone is conveniently used as a solvent in the process.

The phenylenediamine derivatives are effective antiozonants for both natural and synthetic rubber. Synthetic rubbers which are protected include polymers of 1,3-butadiene, for instance 1,3-butadiene itself and isoprene, copolymers of 1,3-butadienes with other monomers, such as styrene, acrylonitrile, isobutylene or methyl methacrylate, and polyolefin rubbers, for instance ethylene-propylene copolymers and terpolymers.

The antiozonant can be incorporated into the rubber by conventional means, using for example a roll mill or an internal mixer. Where the process is used to produce a vulcanised rubber having improved resistance to deterioration, the antiozonant is normally incorporated into the rubber prior to vulcanisation together with other commonly used ingredients, such as for instance zinc oxide, stearic acid, a filler, a vulcanising agent and a vulcanisation accelerator. The vulcanisation proper, in which the mixture so obtained is heated, is carried out at a temperature appropriate to the particular rubber concerned, for example at a temperature of about 135–155° C. where the composition is based on natural rubber, or at a temperature of about 140–160° C. where the composition is based on a styrene-butadiene rubber.

The phenylenediamine derivatives are also effective as stabilisers for unvulcanised rubbers. Incorporation can be by milling into the solid rubber, but very often and particularly where the rubber is synthetic, the phenylenediamine is more conveniently added to a latex or solution of the rubber, for example one obtained during its manufacture.

The amount of the phenylenediamine incorporated in the rubber can vary between wide limits, but in general it has been found preferable to use from 0.2 to 3 parts by weight, and particularly from 0.5 to 2 parts by weight per hundred parts by weight of rubber. Amounts somewhat outside these limits can sometimes be employed, for instance from 0.1 to 5 parts of the additive per 100 parts of rubber.

The invention is illustrated by the following examples.

EXAMPLE 1

This example describes the production of $N,N^1$-diisopropyl-2,5-dimethyl-p-phenylenediamine.

A solution of 17.3 grams (o.13) mole) of 2,5-dimethyl-p-phenylenediamine in 100 cc. of acetone was stirred with 1 gram of 5% platinum on carbon catalyst at 100° C. under a maximum hydrogen pressure of 1000 pounds per square inch for 6 hours. After cooling, the catalyst was removed by filtration and the excess of acetone was evaporated from the filtrate to give a brown solid residue. This was crystallised from petroleum ether giving 15 grams (52% yield) of N,N-diisopropyl-2,5-dimethyl-p-phenylenediamine as buff needles having a melting point of 71–73° C. (Found: C, 76.6%; H, 11.0%; N, 12.6%. $C_{14}H_{24}N_2$ requires C, 76.3%; H, 11.0%; N, 12.7%.)

EXAMPLE 2

This example describes the production of N,N-diisopropyl-2,5-diethyl-p-phenylenediamine.

2,5-diethyl-p-nitroaniline was first prepared from 2,5-diethyl-acetanilide via 2,5-diethyl-4-nitroacetanilide.

A solution of 13 grams of 2,5-diethyl-p-nitroaniline in 90 cc. of acetone was stirred with 1 gram of 5% platinum on carbon catalyst for 5 hours under a maximum hydrogen pressure of 1000 pounds per square inch. After cooling, the catalyst was removed by filtration and the excess of acetone was evaporated from the filtrate to give a residual oil. Distillation of the oil under reduced pressure gave N,N-diisopropyl-2,5-diethyl-p-phenylenediamine as a main fraction having a boiling range of 108–112° C. at a pressure of 0.1 mm. of mercury. The yield was 12.8 grams (77%). (Found: C, 77.4%; H, 11.2%; N, 11.4%. $C_{16}H_{28}N_2$ requires C, 77.4%; H, 11.3%; N, 11.3%.)

EXAMPLE 3

This example describes the production of N,N-diisopropyl-2,5-di-t-butyl-p-phenylenediamine.

10 grams of 2,5-di-t-butyl-p-phenylenediamine in 50 cc. of acetone were heated at 120° C. for 3 hours under a maximum hydrogen pressure of 600 pounds per square inch in the presence of 2 grams of a platinum/charcoal catalyst. After cooling, the catalyst was filtered off and washed with hot acetone and then the filtrate was evaporated to give a green solid. Crystallisation from aqueous methanol gave 9 grams of N,N-diisopropyl-2,5-di-t-butyl-p-phenylenediamine in the form of yellow plates (Analysis of the product gave C, 79.1%; H, 11.7%; N, 9.3%. $C_{20}H_{36}N_2$ requires C, 79.0%; H, 11.9%; N, 9.2%.)

A vulcanised rubber containing 50 parts by weight of H.A.F. carbon black and 1.5 parts by weight of N,N-diisopropyl-2,5-di-t-butyl-p-phenylenediamine was found by visual inspection of specimens subjected to Ross flexing and static exposure under ordinary atmospheric conditions, to be significantly protected against ozone attack. Specimens of a control rubber, identical in composition except for the absence of the phenylenediamine derivative, became much more severely cracked under the same test conditions.

EXAMPLE 4

This example describes the production of $2,5,N,N^1$-tetraisopropyl-p-phenylenediamine.

2,5-diisopropylbenzoquinone dioxime, a solid having a melting point of 233–234° C., was obtained from 2,5-diisopropylbenzoquinone by reaction with hydroxylamine hydrochloride in ethanol.

A stirred solution of 8 grams (0.036 mole) of 2,5-diisopropylbenzoquinone dioxime in 50 cc. of acetone was heated in the presence of a platinum on charcoal catalyst at 130° C. for 4 hours under a maximum hydrogen pressure of 1300 pounds per square inch. After cooling, the catalyst was filtered off, and excess acetone was evaporated from the filtrate to give 10 grams of a solid residue. Distillation of the residue under reduced pressure gave $2,5,N,N^1$-tetraisopropyl-p-phenylenediamine as a main fraction weighing 7 grams (70% yield) and having a boiling range of 115–121° C. at a pressure of 0.55 mm. of mercury. The distillate solidified on cooling, and a sample crystallised from petroleum ether (boiling point 40–60° C.) was obtained as white crystals having a melting point of 65–66° C. (Found: C, 78.5%; H, 11.7%; N, 9.95%. $C_{18}H_{32}N_2$ requires C, 78.2%; H, 11.7%; N, 10.1%.)

EXAMPLE 5

This example describes the production of 2,6-dimethyl-$N,N^1$-diisopropyl-p-phenylenediamine.

18 grams of 2,6-dimethyl-p-phenylenediamine (0.13 mole) in 100 cc. of acetone were heated at 100° C. under a maximum hydrogen pressure of 1,150 p.s.i. in the presence of 2 grams of a platinum on charcoal catalyst until hydrogen uptake ceased. Isolation of the product in the manner described in the previous examples gave 19 grams of a blue oil boiling at 100–105° C. under a pressure of 0.17 mm. of mercury. Redistillation gave 15.5 grams of 2,6-dimethyl-N,N$^1$-diisopropyl-p-phenylenediamine as a blue oil boiling at 96–99° C. at a pressure of 0.15 mm. of mercury. This yield is 53% of the theoretical. (Found: C, 76.3%; H, 11.4%; N, 12.9%. $C_{14}H_{24}N_2$ requires C, 76.3%; H, 11.0%; N, 12.7%.)

EXAMPLE 6

This example describes the production of 2,5-diisopropyl - N,N$^1$ - bis(1,4-dimethylpentyl)-p-phenylene diamine.

A solution of 18.5 grams (0.083 mole) of 2,5-diisopropylbenzoquinone dioxime in 100 cc. of methyl-isoamyl ketone and 5 cc. of acetic acid was heated at 100° C. under a maximum hydrogen pressure of 1000 p.s.i. in the presence of 1 gram of a platinum on charcoal catalyst until hydrogen uptake ceased. The catalyst was filtered off and the filtrate was poured into 1 litre of water. The organic phase was extracted into ether and the ether extracts washed with sodium bicarbonate solution and dried. Evaporation of the ether gave a residue which was distilled giving 18.7 grams (58%) of 2,5-diisopropyl-bis(1,4 - dimethylpentyl)-p-phenylenediamine having a boiling point of 149–155° C. at a pressure of 0.2 mm. of mercury. The product solidified on cooling, and a sample crystallised from petroleum ether had a melting point of 64–65° C. (Found: C. 80.7%; H, 13.2%; N, 7.5%. $C_{26}H_{48}N_2$ requires C, 80.4; H, 12.5%; N, 7.2%.)

EXAMPLE 7

This example describes the production of 2,3-dimethyl-N,N$^1$-diisopropyl-p-phenylenediamine.

21 grams of 2,3-dimethyl-p-phenylenediamine (0.155 mole) in 100 cc. of acetone were heated at 100° C. under a maximum hydrogen pressure of 1000 p.s.i. in the presence of a platinum on charcoal catalyst until hydrogen uptake ceased. The catalyst was filtered off and the excess acetone evaporated to give 33.1 grams of a dark oil. Distillation gave 25.5 grams of 2,3-dimethyl-N,N$^1$-diisopropyl-p-phenylenediamine with a boiling point of 103–105° C. at 0.25 mm. of mercury. The yield was 74% of the theoretical. (Found: C, 76.5%; H, 11.2%. N, 12.7%. $C_{14}H_{24}N_2$ requires C, 76.3%; H, 11.0%; N, 12.7%.)

EXAMPLE 8

This example describes the production of 2,5-dimethyl-N,N$^1$-bis(1,4-dimethylpentyl))-p-phenylenediamine.

Reductive alkylation of a solution of 12 grams of 2,5-dimethyl-p-phenylenediamine (0.088 mole) in 75 cc. of methyl isoamyl ketone using a platinum on charcoal catalyst gave 20 grams of 2,5-dimethyl-N,N$^1$-bis(1,4-dimethylpentyl)-p-phenylenediamine having a boiling point of 160–162° C. at a pressure of 0.35 mm. of mercury. The yield is 69% of the theoretical. (Found: C, 79.2%; H, 12.05%; N, 9.1%. $C_{20}H_{40}N_2$ requires C, 79.45%; H, 12.1%; N, 8.4%.)

EXAMPLE 9

This example describes the production of 2,5-dimethyl-N-isopropyl-N$^1$-phenyl-p-phenylenediamine.

2,5-dimethyl-4-nitrodipenylamine was prepared by the condensation of 2,5-dimethyl-4-chloronitrobenzene with aniline in the presence of potassium carbonate.

A solution of 13 grams (0.054 mole) of 2,5-dimethyl-4-nitrodiphenylamine in 100 cc. of acetone was heated at 100° C. under a maximum hydrogen pressure of 1000 p.s.i. in the presence of platinum on charcoal catalyst until hydrogen uptake was complete. The catalyst was filtered off and the filtrate evaporated to give 13 grams of a pale brown semi-solid residue. Crystallisation from a mixture of benzene and petrol gave 3 grams of 2,5-dimethyl-N-isopropyl-N$^1$-phenyl- p - phenylenediamine as white micro-crystals having a melting point of 85–86° C. (Found: C, 80.6%; H, 8.9%; N, 11.4%. $C_{17}H_{22}N_2$ requires C, 80.3%; H, 8.7%; N, 11.0%.)

EXAMPLE 10

This example describes the production of a white rubber stock containing N,N-diisopropyl-2,5-di-t-butyl-p-phenylenediamine, and the tests employed in assessing the discolouration and staining properties of the antiozonant.

A masterbatch of the following compositions was mixed on a laboratory rubber mill:

| | Parts by weight |
|---|---|
| Pale crepe | 100 |
| Zinc oxide | 5 |
| Stearic acid | 1 |
| Blanc fixe | 50 |
| Titanium oxide | 5 |

Into one portion of the masterbatch there were incorporated sulphur, tetramethyl thiuram disulphide and the p-phenylenediamine derivative in amounts equivalent respectively to 2.5%, 0.4% and 2% of the weight of the pale crepe. A control stock was prepared by incorporating into a second portion of the masterbatch only the sulphur and tetramethyl thiuram disulphide. For comparison purposes, a third stock containing the sulphur, tetramethyl thiuram disulphide and 2% of N-isopropyl-N$^1$-phenyl-p-phenylenediamine, and a fourth stock containing the sulphur, tetramethyl thiuram disulphide and 2% of N,N - diisopropyl 2,3,5,6 - tetramethyl-p-phenylenediamine were prepared.

Each stock was then cured, in the form of a sheet approximately 3 mm. thick, by heating at 140° C. for 10 minutes. A number of 1 cm. square samples were then cut from each sheet. In investigating the tendency of the antiozonant to discolour the rubber itself, samples of all types were exposed to U.V. light for 5 hours, at the end of which period the colour of the test samples was compared with that of the controls. The controls had remained substantially white; the samples containing N,N-diisopropyl-2,5-di-t-butyl-p - phenylene and N,N - diisopropyl-2,3,5,6-tetramethyl - p-phenylenediamine had discoloured slightly and to about the same extent, while the samples containing N - isopropyl-N$^1$-phenyl-p-phenylenediamine were much more severely discoloured.

In investigating the tendency of the rubber containing the antiozonant to stain other materials with which it came into contact, samples of each type were placed on a white cellulose-acetate coated sheet and on a larger portion of the sheet of the control rubber, and were held under a load of 4 kilograms in an oven at 70° C. for 48 hours. After removal from the oven, the sheets of cellulose acetate coated material and of the control rubber on which the 1 cm. square samples had rested were exposed to U.V. light for 5 hours and then examined for the development of colour. There was no staining of the areas where the control samples had been placed; the areas corresponding to the locations of the test samples containing N,N$^1$ - diisopropyl-2,5-di-t-butyl-p-phenylenediamine became vellum in colour, while the areas corresponding to the locations of the samples containing N,N$^1$-diisopropyl-2,3,5,6-tetramethyl-p - phenylenediamine and N-isopropyl-N$^1$-phenyl-p-phenylenediamine were heavily stained to an extent estimated to be between 5 and 6 times the intensity of staining from the samples containing the p-phenylenediamine derivative of the invention.

The slight degree of yellowing associated with the use of the p-phenylenediamine derivative of the invention in the above tests indicated that it would be generally acceptable for use as an antiozonant in white and light coloured rubbers.

EXAMPLE 11

The discolouration characteristics of other p-phenylenediamine derivatives of the invention were assessed by the methods described in Example 10.

The following p-phenylenediamine derivatives were found to be non-discolouring, i.e. indistinguishable from the control:

N,N¹-diisopropyl-2,5-dimethyl-
N,N¹-2,5-tetraisopropyl-
N,N¹-bis(1,4-dimethylpentyl)-2,5-dimethyl-
N,N¹-bis(1,4-dimethylpentyl)-2,5-diisopropyl- N,N¹-diisopropyl-2,3-dimethyl - p-phenylenediamine was very slightly discolouring, while N,N¹-diisopropyl-2,6-dimethyl-p-phenylenediamine gave a somewhat greater degree of discolouration comparable with that given by N,N¹-diisopropyl 2,3,5,6-tetramethyl-p-phenylenediamine.

EXAMPLE 12

The antiozonant activities of various p-phenylenediamine derivatives of the invention were assessed as follows:

The antiozonant was compounded into a rubber stock having the composition

|  | Parts by weight |
| --- | --- |
| Styrene-butadiene rubber (S.B.R. 1502) | 100 |
| High abrasion furnace black | 50 |
| Process oil | 8 |
| Zinc oxide | 5 |
| Stearic acid | 1 |
| Sulphur | 2 |
| N-cyclohexyl benzothiazole-2-sulphenamide | 1.2 |
| Antiozonant | 2 |

Samples suitable for examination on the Ross flexing machine (see 1966 Book of ASTM Standards, Part 28, page 496) were prepared, as well as others in the form of bands for static exposure in an ozone-containing atmosphere. The stock was vulcanised at 153° C. for 30 minutes. The Ross flexing test was conducted out of doors and the static exposure tests in an ozone chamber containing about 15 parts per hundred million of ozone, with some bands subjected to 10% extension and others to 20% extension. The degree of cracking of the rubber (for which the attack of ozone on the rubber is responsible) was observed at intervals, and from such observations the rate of deterioration of the rubber was assessed.

In the table of results given below, the figures (which are inversely proportional to the rate of deterioration of the rubber-or directly proportional to the effectiveness of the antiozonant) lie on an arbitrary scale in which 0 indicates the performance of the blank containing no antiozonant, 50 indicates the performance of 6-ethoxy-2,2,4-trimethyl-1,2-dihydroquinoline, a commercial product having moderate antiozonant activity, and 100 the performance of N-isopropyl-N¹-p-phenylenediamine, a very effective antiozonant but one which is unsuitable for use in light-coloured products. The results quoted for static exposure are averages for bands held at 10% extension and at 20% extension.

| Antiozonant | Ross | Static |
| --- | --- | --- |
| Blank | 0 | 0 |
| 6-ethoxy-2,2,4-trimethyl-1,2-dihydroquinoline | 50 | 50 |
| N-isopropyl-N -phenyl-p-phenylenediamine | 100 | 100 |
| N,N'-diisopropyl-2,3,5,6-tetramethyl-p-phenylenediamine | 40 | 70 |
| N,N'-diisopropyl-2,3-dimethyl-p-phenylenediamine | 90 | 100 |
| N,N'-diisopropyl-2,5-dimethyl-p-phenylenediamine | 95 | 100 |
| N,N'-diisopropyl-2,6-dimethyl-p-phenylenediamine | 85 | 85 |
| N,N'-2,5-tetraisopropyl-p-phenylenediamine | 50 | 80 |
| N,N'-bis(1,4-dimethylpentyl)2,5-dimethyl-p-phenylenediamine | 40 | 80 |
| N-isopropyl-N'-phenyl-2,5-dimethyl-p-phenylenediamine | 75 | 60 |
| N,N'-bis(1,4-dimethylpentyl)-2,5-diisopropyl-p-phenylenediamine | 25 | 70 |
| N,N'-diisopropyl-2,5-di-t-butyl-p-phenylenediamine | 40 | 50 |
| N,N'-bis(1,4-dimethylpentyl)-2,5-di-t-butyl-p-phenylenediamine | 5 | 20 |

The results given in the foregoing examples show that the p-phenylenediamine derivatives of the invention have high antiozonant activities, better than that of N,N¹-diisopropyl-2,3,5,6-tetramethyl-p-phenylenediamine, where the nuclear substituents are alkyl groups of up to 3 carbon atoms each and the total number of carbon atoms in the nuclear alkyl groups and the N-alkyl groups is not greater than 16. The antiozonant activity is not markedly dependent on the positions of the alkyl substituents in the nucleus, but the 2,5-dialkyl compounds have better discolouration properties than the corresponding 2,3- and 2,6-dialkyl-p-phenylenediamines.

There is a general tendency for staining to decrease as the size of the nuclear alkyl groups is increased, but this is accompanied by a loss of antiozonant properties. A useful degree of antiozonant activity is retained, however, provided the total number of carbon atoms in the nuclear alkyl groups and N-alkyl groups does not exceed 20. N,N¹-diisopropyl-2,5-di-t-butyl-p-phenylenediamine for example, although less active than N-N-diisopropyl-2,3,5,6-tetramethyl-p-phenylenediamine as an antiozonant under static conditions, shows the same activity under dynamic conditions. It is, moreover, considerably less staining than the p-phenylenediamine containing four nuclear alkyl groups.

The result included in Example 12 for N,N¹-bis(1,4-dimethylpentyl)-2,5-di-t-butyl-p-phenylenediamine shows the marked falloff of antiozonant activity when the number of carbon atoms in the nuclear and N-alkyl groups exceeds 20.

What we claim is:

1. A composition comprising a rubber normally subject to ozone-induced deterioration selected from the group consisting of natural rubber, 1,3-polybutadiene rubber, synthetic polyisoprene rubber, copolymer of 1,3-butadiene with styrene, acrylonitrile, isobutylene or methylmethacrylate, ethylene-propylene copolymer rubber and ethylene-propylene terpolymer rubber and a stabilizing amount of a p-phenylenediamine substantially non-discoloring to the rubber having the formula

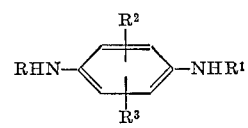

in which each of R and R¹ is isopropyl, s-butyl; 1,2-dimethylpropyl, 1,3-dimethylbutyl or 1,4-dimethylpentyl, and R² and R³ are alkyl of up to 3 carbon atoms adjacent to different nitrogen atoms provided that the total number of carbon atoms in R, R¹, R² and R³ is not greater than 16.

2. A composition according to claim 1 in which the p-phenylenediamine derivative is present in an amount of from 0.2 to 3 parts by weight per 100 parts by weight of the rubber.

3. A composition comprising a rubber normally subject to ozone-induced deterioration and a p-phenylenediamine derivative according to claim 2 in which each of R² and R³ is methyl.

4. A composition according to claim 3, in which the rubber is diene hydrocarbon rubber and the p-phenylenediamine derivative is present in an amount of from 0.2 to 3 parts by weight per 100 parts by weight of the rubber.

5. A composition of claim 1 in which the rubber is diene hydrocarbon rubber, R² and R³ are in the 2 and 5 position, the p-phenylenediamine is in an amount of from 0.2 to 3 parts by weight per 100 parts by weight of the rubber together with other additives conventionally used in the production of a white or light-colored vulcanizate.

6. A composition according to claim 4 in which each of R and R' is isopropyl and $R^2$ and $R^3$ are in the 2 and 5 position.

References Cited
UNITED STATES PATENTS

| | | | |
|---|---|---|---|
| 2,965,605 | 12/1960 | Reynolds et al. | 260—45.9 |
| 3,057,819 | 10/1962 | Kibler | 260—45.9 |
| 3,163,616 | 12/1964 | Stahly | 260—45.9 |
| 3,271,453 | 9/1966 | Csendes | 260—45.9 |
| 3,052,520 | 5/1962 | Shaw | 260—45.9 |
| 3,157,615 | 11/1964 | Stahly | 260—45.9 |

HOSEA E. TAYLOR, Primary Examiner

U.S. Cl. X.R.

260—576, 809, 814